US011951053B2

(12) United States Patent
Song

(10) Patent No.: US 11,951,053 B2
(45) Date of Patent: Apr. 9, 2024

(54) WHEEL CHAIR WITH LIFTING FUNCTION

(71) Applicant: Soon Young Song, Anyang-si (KR)

(72) Inventor: Soon Young Song, Anyang-si (KR)

( * ) Notice: Subject to any disclaimer, the term of this patent is extended or adjusted under 35 U.S.C. 154(b) by 14 days.

(21) Appl. No.: 17/908,920

(22) PCT Filed: Mar. 11, 2021

(86) PCT No.: PCT/KR2021/003003
§ 371 (c)(1),
(2) Date: Sep. 2, 2022

(87) PCT Pub. No.: WO2021/210784
PCT Pub. Date: Oct. 21, 2021

(65) Prior Publication Data

US 2023/0086287 A1 Mar. 23, 2023

(30) Foreign Application Priority Data

Apr. 14, 2020 (KR) ........................ 10-2020-0044989

(51) Int. Cl.
*A61G 5/14* (2006.01)
*A61G 5/08* (2006.01)
*A61G 5/10* (2006.01)

(52) U.S. Cl.
CPC ................. *A61G 5/14* (2013.01); *A61G 5/08* (2013.01); *A61G 5/1059* (2013.01); *A61G 5/1005* (2013.01)

(58) Field of Classification Search
CPC .......... A61G 5/14; A61G 5/08; A61G 5/1059; A61G 5/1005; A61G 5/10; A61G 5/00; A61G 5/02; A47K 13/10; A47K 17/00; A47K 17/02; B60K 1/02
USPC .......................................................... 280/650
See application file for complete search history.

(56) References Cited

U.S. PATENT DOCUMENTS

| | | | | |
|---|---|---|---|---|
| 4,323,133 A * | 4/1982 | Williams | A61G 5/125 280/42 |
| 10,835,088 B2 * | 11/2020 | Song | A47K 13/10 |
| 2012/0007341 A1 | 1/2012 | Masaki | |
| 2020/0305661 A1 * | 10/2020 | Song | A47K 13/105 |

FOREIGN PATENT DOCUMENTS

| | | | |
|---|---|---|---|
| JP | 2002-291653 A | 10/2002 | |
| JP | 2012-016504 A | 1/2012 | |
| KR | 20160048260 A * | 10/2014 | A61G 5/10 |
| KR | 10-1648667 B1 | 8/2016 | |
| KR | 10-1656450 B1 | 9/2016 | |
| KR | 10-2062486 B1 | 1/2020 | |

OTHER PUBLICATIONS

International Search Report for PCT/KR2021/003003 dated Aug. 4, 2021 from Korean Intellectual Property Office.

* cited by examiner

*Primary Examiner* — James A Shriver, II
*Assistant Examiner* — Hilary L Johns
(74) *Attorney, Agent, or Firm* — Revolution IP, PLLC

(57) ABSTRACT

Disclosed is a wheelchair, and particularly to a wheelchair with a lifting function, which has a simple structure for automatically moving a seating block where a wheelchair user is sitting, and enables the seating block to have a lifting movement and a rotational movement, thereby simplifying a structure and assisting the wheelchair user in standing up safely.

2 Claims, 11 Drawing Sheets

WHEEL CHAIR WITH LIFTING FUNCTION

TECHNICAL FIELD

The disclosure relates to a wheelchair, and particularly to a wheelchair with a lifting function, which has a simple structure for automatically moving a seating block where a wheelchair user is sitting, and enables the seating block to have a lifting movement and a rotational movement, thereby simplifying a structure and assisting the wheelchair user in standing up safely.

BACKGROUND ART

Recently, with continuous increase of elderly population and acceleration of an aging society, demand for wheelchairs is increasing. Here, the wheelchair refers to a chair that has wheels, armrests and a back to enable the elderly, disabled and sick, who have less mobility, to move.

Korean Patent No. 10-1648667 (hereinafter referred to as the "related art") has disclosed an electric wheelchair convertible to a bed mode and a standing mode, thereby allowing a user to keep lying down or standing up.

However, the wheelchair disclosed in the related art only lifts the back of a lying user to keep a sitting posture but is not capable of assisting the seated user in standing up on the floor, and has problems in that a portion where a user sits is not convenient and stable.

DISCLOSURE

Technical Problem

The disclosure is conceived to solve the problems of the related art, and an aspect of the disclosure is to provide a wheelchair with a lifting function, which has a simple structure for automatically moving a seating block where a wheelchair user is sitting, and enables the seating block to have a lifting movement and a rotational movement, thereby simplifying a structure and assisting the wheelchair user in standing up safely.

Technical Solution

According to an embodiment of the disclosure, a wheelchair with a lifting function, including: a seating block including a structure, on which a user can sit, and mounted movably; a pair of lifting blocks connected to opposite lower portions of the seating block, and operating the seating block to have at least one of a lifting movement and a rotational movement; a pair of wheel sets respectively coupled to the lifting blocks and enabling the wheelchair to move; a pair of movement control units respectively coupled to rear upper portions of the lifting blocks and controlling the movement of the wheelchair; and a connecting block connecting the pair of lifting blocks each other.

Here, the seating block may include a pair of connecting rods respectively connected to the lifting blocks, a seating rod fastened to and supported on the pair of connecting rods, and a pair of safety bars respectively fastened to opposite sides of the seating rod and extended upward, each safety bar may include a horizontal rod disposed at a lateral upper side of the seating rod, a pair of vertical rods connecting a lower end of the horizontal rod and a lateral portion of the seating rod, and a handle connected to a front end of the horizontal rod or an upper end of the front vertical rod and extended being inclined frontwards and upwards.

The lifting block may include a casing, an actuator mounted to an inside of the casing, and a link assembly coupled to an operation frame, to which the connecting rod 69 is connected, and operating the operation frame as activated by the actuator to generate the lifting movement and the rotational movement of the seating block, the link assembly may include a first link that includes a first end pivotally connected inside the casing and a second end pivotally connected to the operation frame, and a second link that is disposed above the first link and includes a first end pivotally connected inside the casing and a second end pivotally connected to the operation frame, and the actuator may be rotatably connected inside the casing, and a driving shaft of the actuator is driven forward and backward by the actuator, being rotatably connected to the first link or the second link.

Further, the connecting block may include a front connection body directly connecting the pair of lifting blocks, and a rear connection body indirectly connecting the pair of lifting blocks by connecting the pair of movement control units each other, and each of the front connection body and the rear connection body is formed in a separable or foldable way.

Advantageous Effects

According to a wheelchair with a lifting function, regarding the foregoing problems and solutions has a simple structure for automatically moving a seating block where a wheelchair user is sitting, and enables the seating block to have a lifting movement and a rotational movement, thereby having advantages of simplifying a structure and assisting the wheelchair user in standing up safely.

MODE FOR INVENTION

Figure 1:
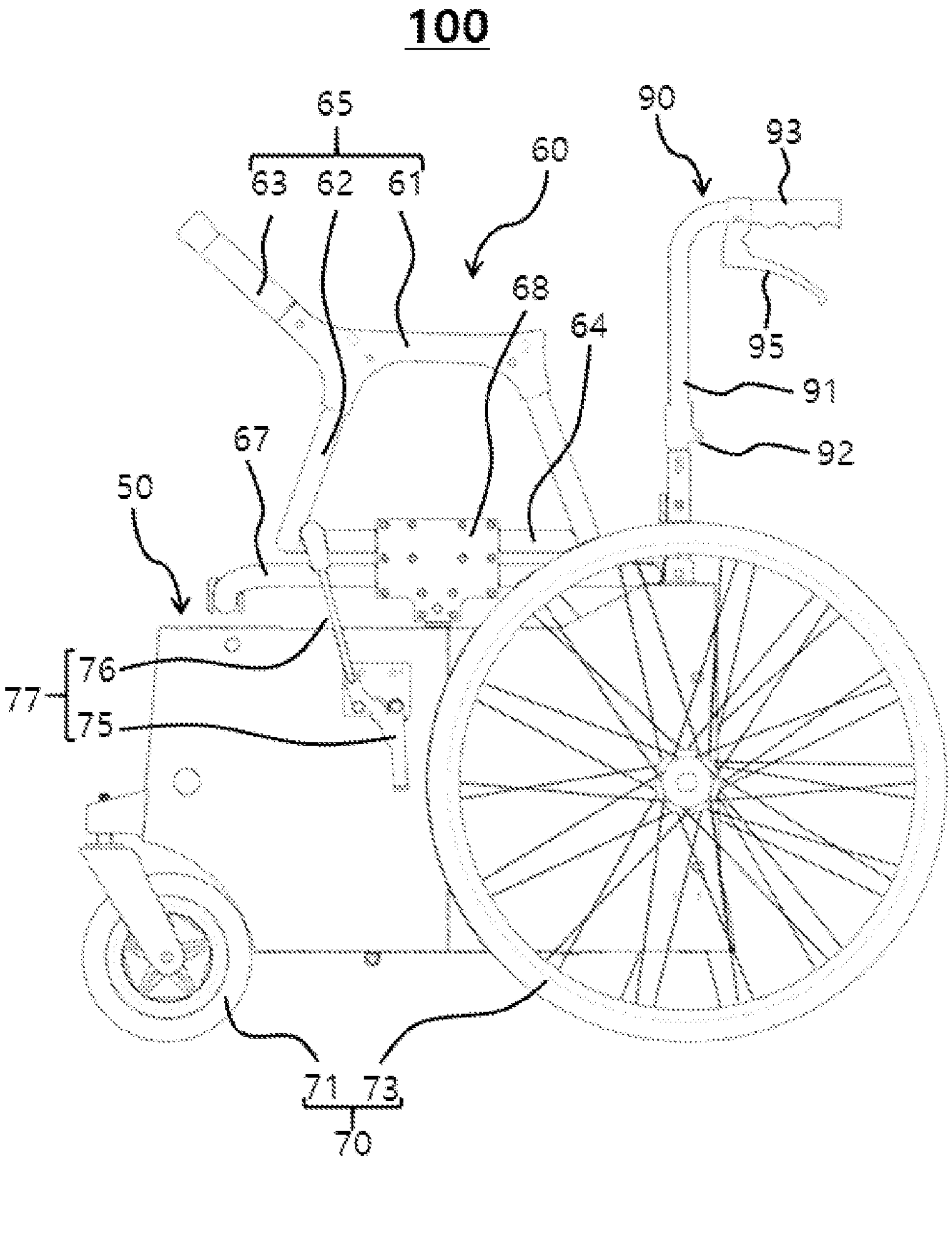
FIGS. 1 to 4 are lateral, front, rear, and plan views of a wheelchair with a lifting function according to an embodiment of the disclosure, respectively.
Figure 2:
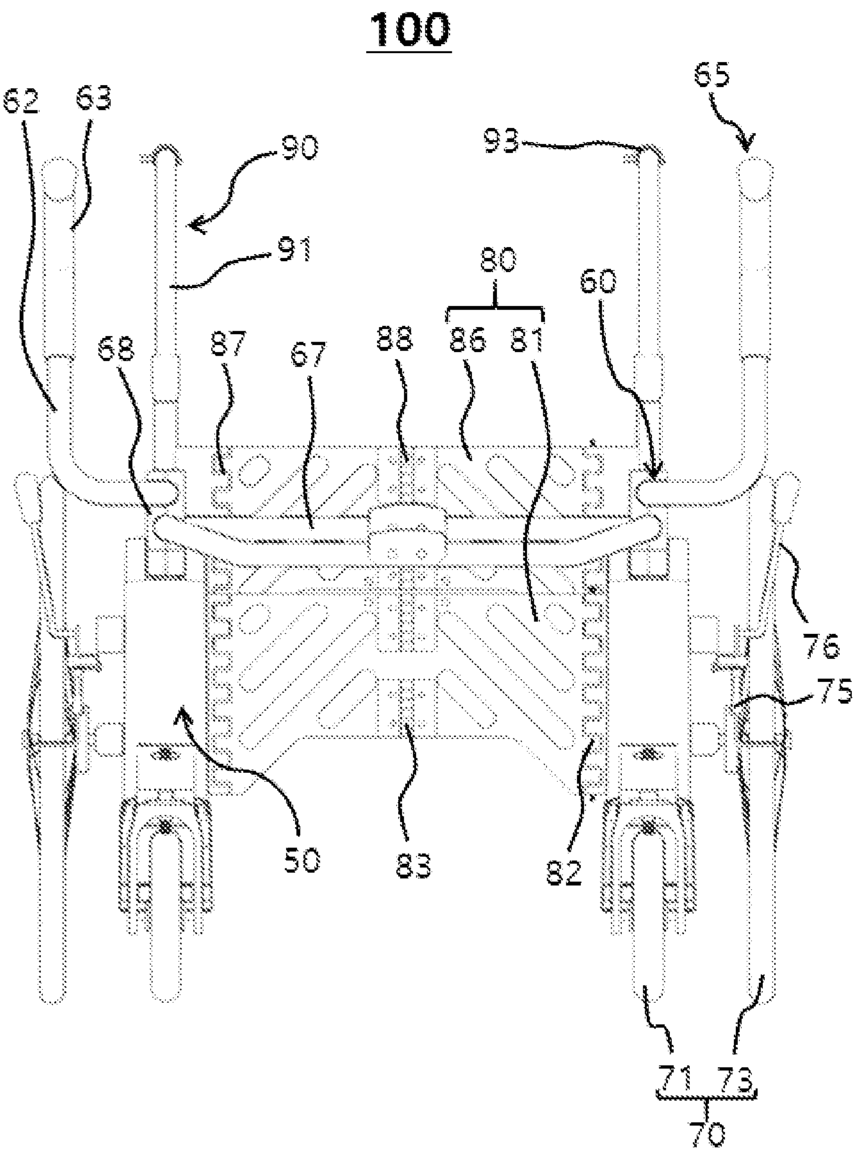
Figure 3:
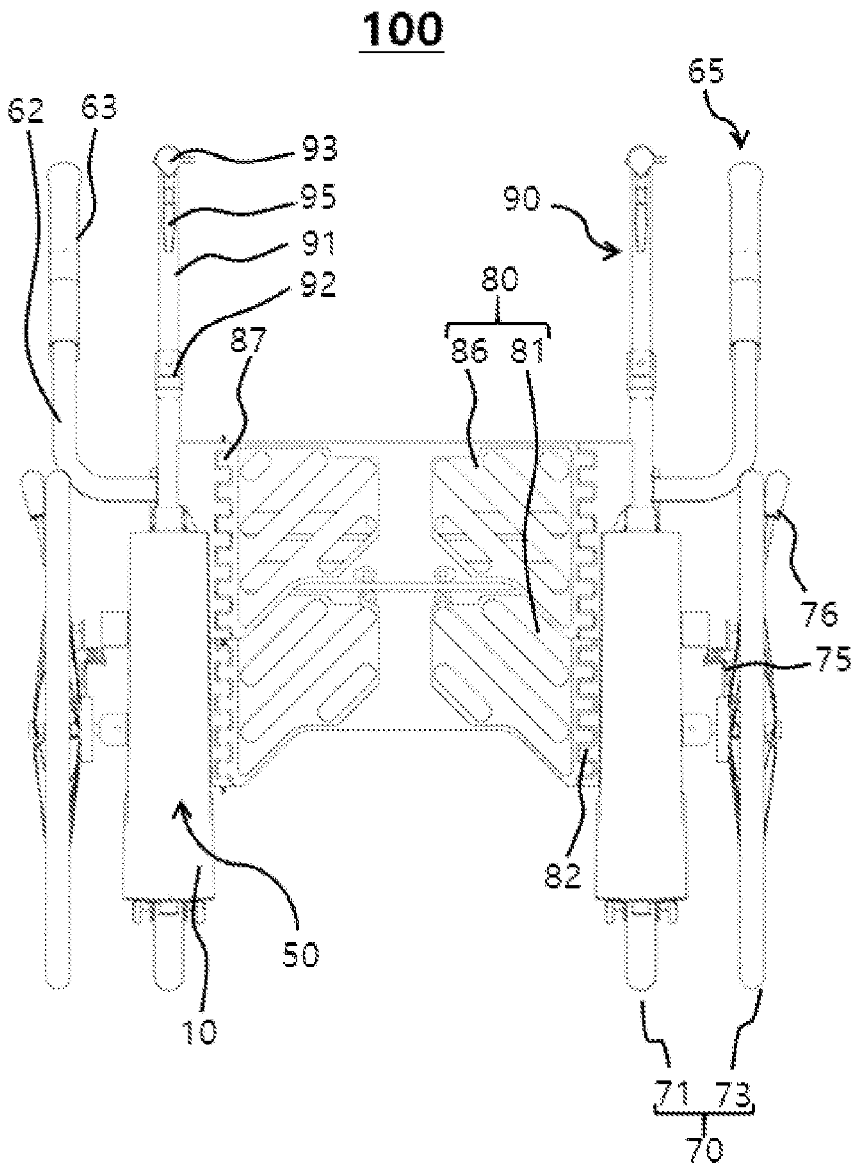
Figure 4:
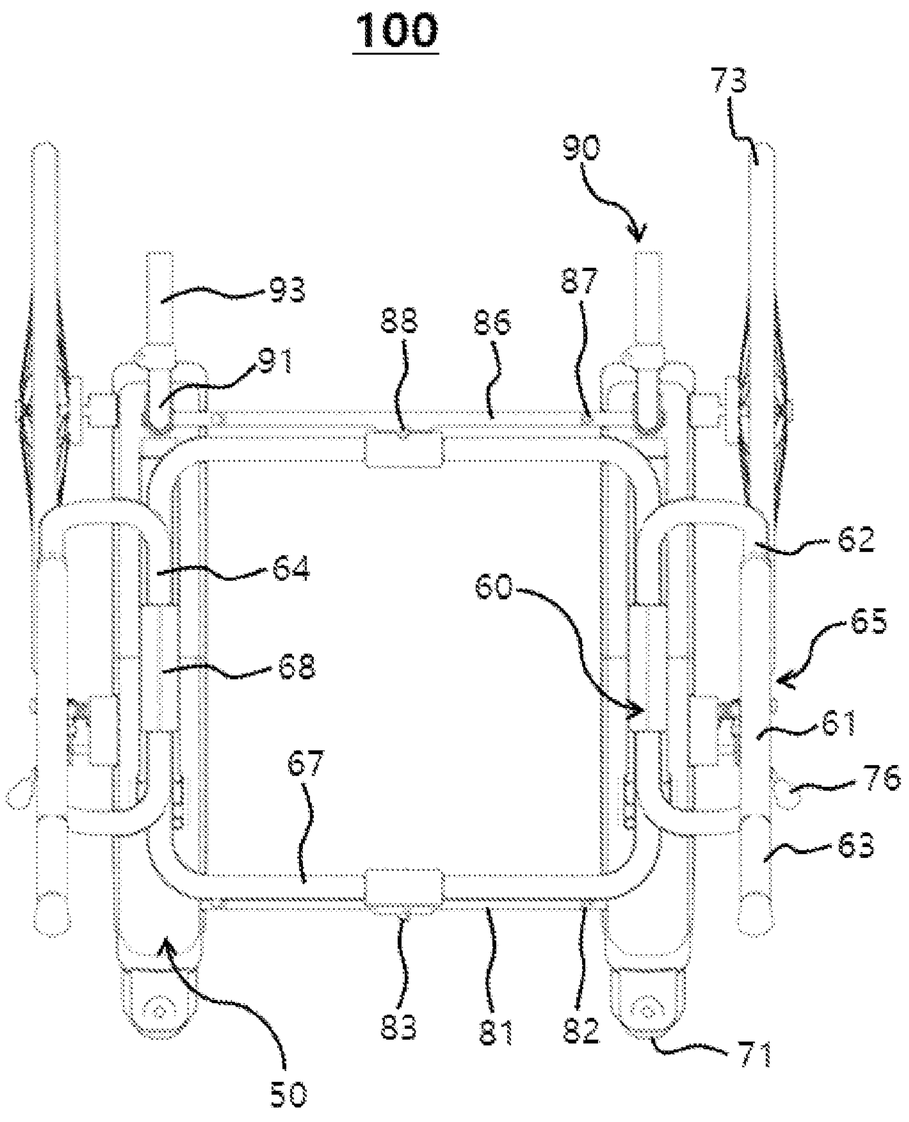
Figure 5:
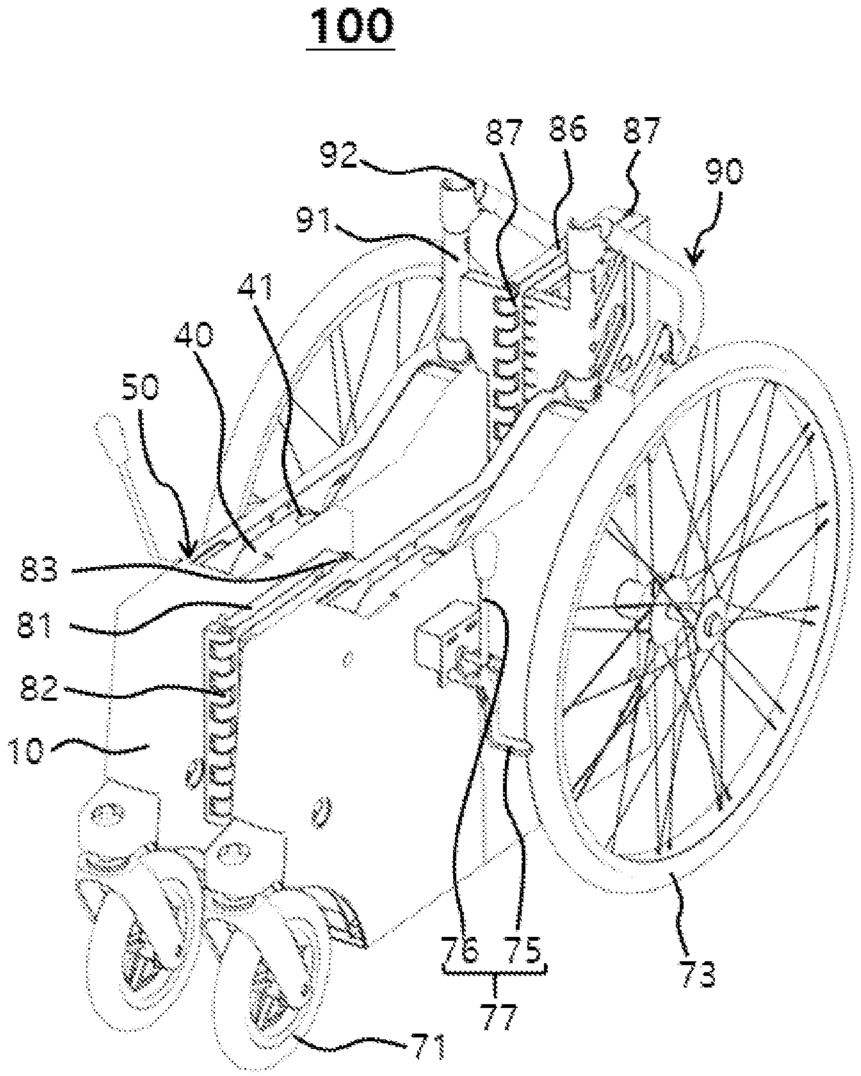
FIGS. 5 to 8 are perspective, lateral, front, and rear views showing a folded state of a wheelchair with a lifting function according to an embodiment of the disclosure, respectively.
Figure 6:
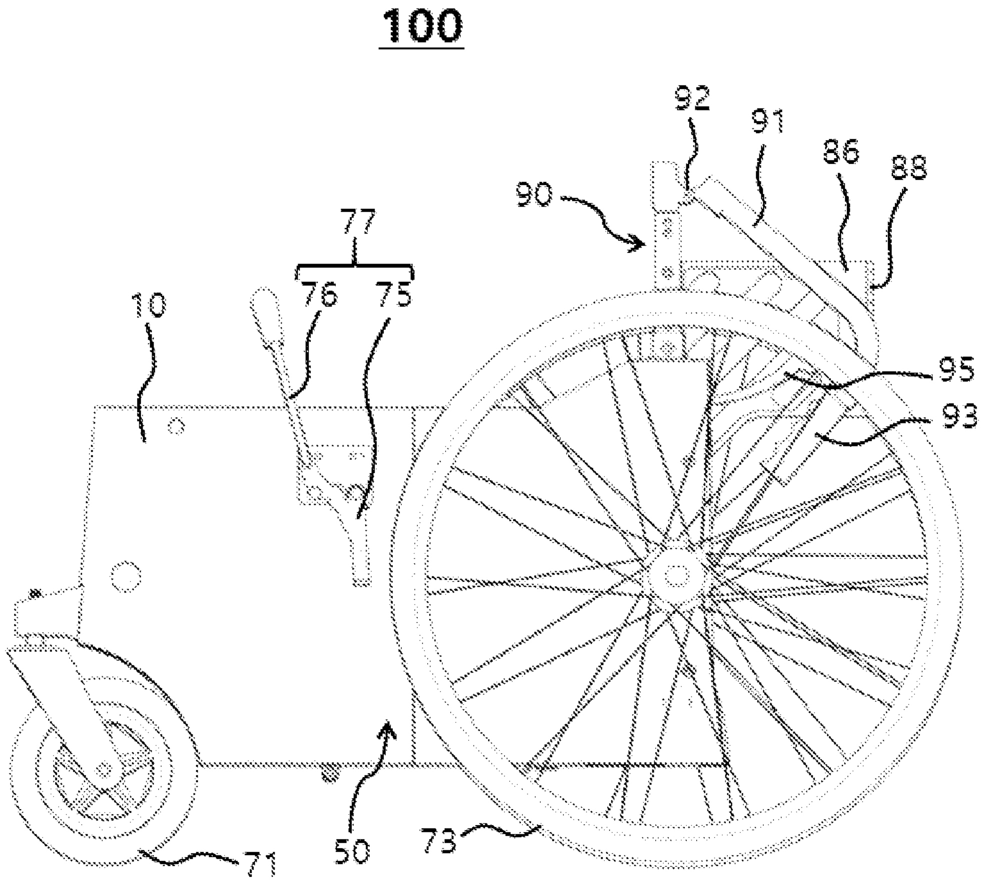
Figure 7:
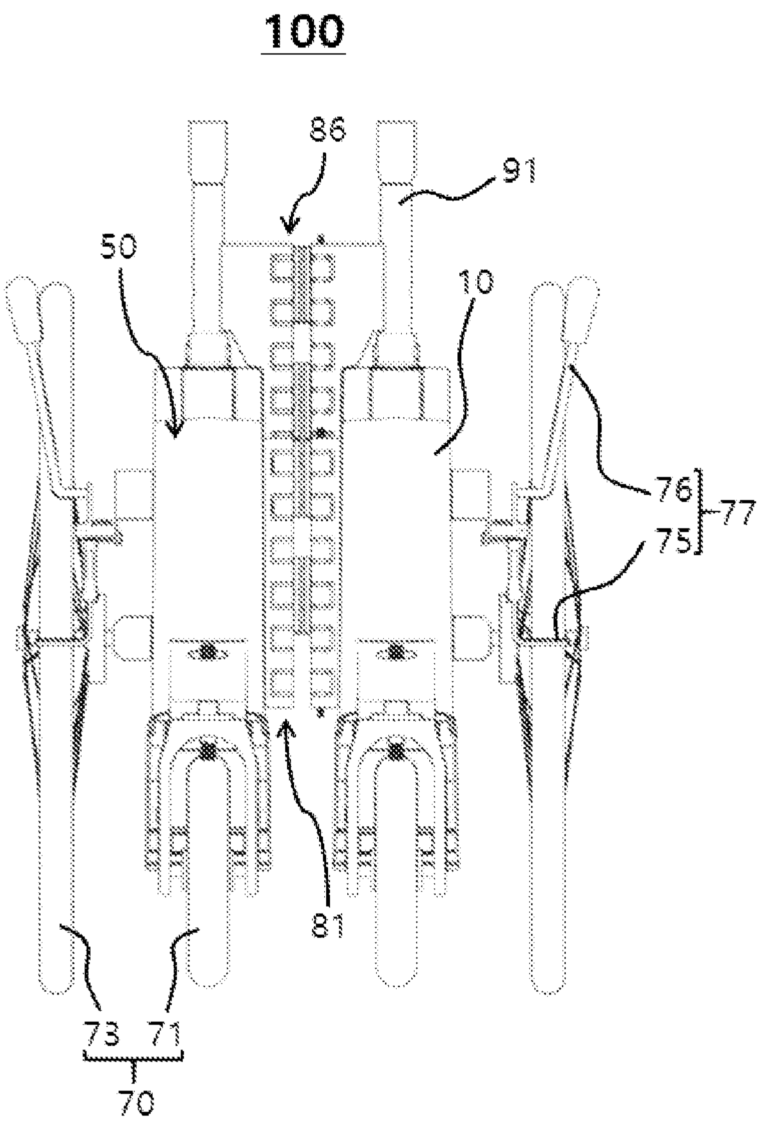
Figure 8:
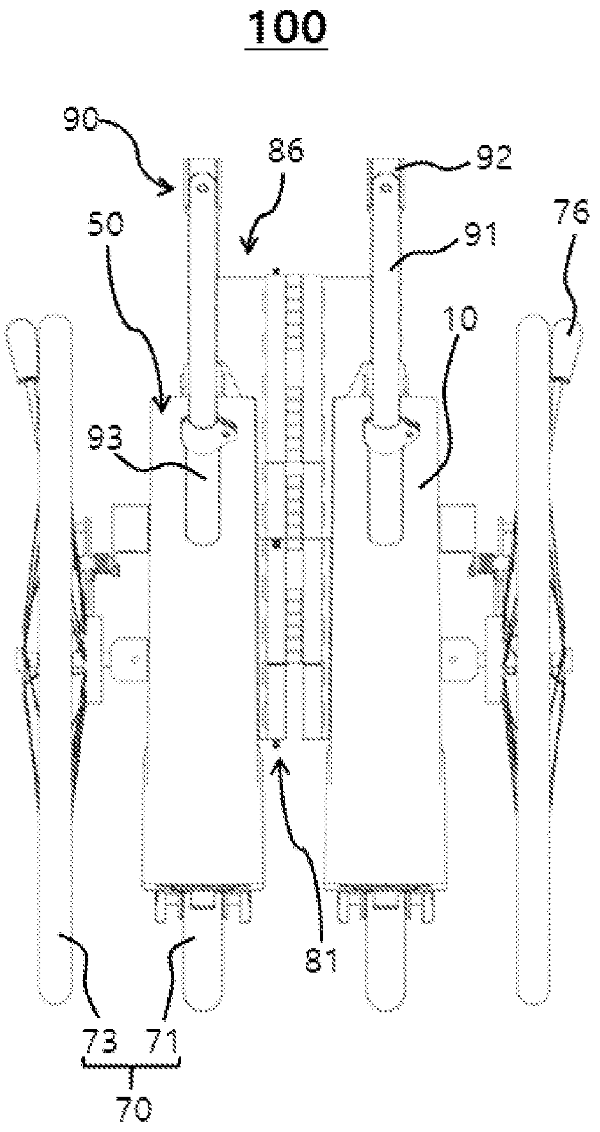

Below, embodiments of a wheelchair with a lifting function according to the disclosure, regarding the foregoing problems, solutions and effects, will be described with reference to the accompanying drawings.

As shown in FIGS. 1 to 8, a wheelchair 100 with a lifting function according to an embodiment of the disclosure includes a seating block 60 having a structure for seating a user, a pair of lifting blocks 50 for operating the movement of the seating block 60, a pair of wheel sets 70 coupled to each lifting block 50, a pair of movement control units 90 coupled to a rear upper portion of each lifting block, and a connecting block 80 connecting the pair of lifting blocks 50.

The seating block 60 has a structure for seating a user who uses the wheelchair, and is movably mounted. In other words, the seating block 60 is mounted to be movable by the pair of lifting blocks 50 while having a structure where a user sits stably.

To this end, the seating block 60 includes a pair of connecting rods 69 respectively connected to the lifting blocks 50, a seating rod 67 fastened to and supported on the pair of connecting rods 69, and a pair of safety bars 65 respectively fastened to the opposite sides of the seating rod 67 and extended upward.

The pair of connecting rods 69 is one-to-one connected to the pair of lifting blocks 50. Specifically, each connecting rod 69 is detachably connected to an upper end of an operation frame 40 of each lifting block 50. For example, each connecting rod 69 is detachably connected in such a way of being inserted in a connecting hole 41 formed at the upper end of the operation frame 50 of each corresponding lifting block 50. Thus, a user or a user assistant (i.e., a caregiver of a user such as the elderly or sick) may mount or demount the seating block 60 to or from the pair of lifting blocks 50 by inserting or pulling the pair of connecting rods 69 in or upwards from the connecting holes 41 of the operation frames 40 of the lifting blocks 50.

The seating rods 67 are fastened to and supported on the pair of connecting rods 69. Specifically, the seating rods 67 are fastened to and supported on the pair of connecting rods 69 and disposed horizontally. Therefore, a user can sit directly on the seating rod 67 or sit on an auxiliary chair or auxiliary seating plate mounted onto the seating rod 67.

The pair of safety bars 65 are fastened to the opposite sides of the seating rod 67 and extended upwards. Therefore, a user may remain stable by leaning on or holding the pair of safety bars 65 while sitting on the seating rod 67 or the auxiliary chair or auxiliary seating plate mounted onto the seating rod 67, and remain safe using the pair of safety bars 65 when sitting on the seating rod 67 or the auxiliary chair or auxiliary seating plate mounted onto the seating rod 67 or standing up from the sitting posture.

The safety bars 65 form a pair. Specifically, the safety bar 65 includes a first safety bar 65 fastened to a first side of the seating rod 67, and a second safety bar 65 fastened to a second side of the seating rod 67, in which the first safety bar 65 and the second safety bar 65 may be detachably coupled to each other at their front-end portions.

The first and second safety bars 65 have the same overall structure. Therefore, the configuration and features of the safety bars 65 to be described below will be equally applied to the first and second safety bars 65. Each safety bar 65 includes a horizontal rod 61 disposed at a lateral upper side of the seating rod 67, a pair of vertical rods 62 connecting a lower end of the horizontal rod 61 and a lateral portion of the seating rod 67, and a handle 63 connected to a front end of the horizontal rod 61 or an upper end of the front vertical rod 62 and extended being inclined frontwards and upwards.

The horizontal rod 61 may have a structure to be used as an armrest for a user while being used by the user, and the pair of vertical rods 62 stably and firmly support the horizontal rod 61 in such a way that the rear vertical rod 62 connects a first lower end of the horizontal rod 61 and a lateral rear side of the seating rod 67 and the front vertical rod 62 connects a second lower end of the horizontal rod 61 and a lateral front side of the seating rod 67.

The handle 63 is not extended in parallel to the horizontal rod 61, but extended being inclined frontwards and upwards while forming an obtuse angle ⊖ with the horizontal rod 61. In this way, the handle 63 is extended being inclined frontwards and upwards with respect to the horizontal rod 61, and is thus more convenient for a user who is sitting on or standing up from the seating rod 67.

The first and second safety bars 65 with the foregoing configuration are respectively coupled to the opposite sides of the seating rod 67, and firmly and stably maintained without deformation in use. Therefore, a user can take a comfortable posture while resting his/her arm on the horizontal rod 61 during usage.

In this way, the safety bar 65 is fastened onto the seating rod 67 and the seating rod 67 is fastened to and supported on the connecting rod 69. To this end, the safety bar 65, the seating rod 67, and the connecting rod 69 may be formed as a single body, but are separately manufactured and then fastened to each another by a fastening unit 68 because it is not easy to manufacture and handle them integrally.

Specifically, the connecting rod 69 is fastened to a lower portion of the fastening unit 68, the seating rod 67 is fastened to a middle portion of the fastening unit 68, and the safety bar 65 is fastened to an upper portion of the fastening unit 68. Here, the safety bar 65 may further include an auxiliary rod 64 to be fastened to the fastening unit 68. The auxiliary rod 64 is fastened to the upper portion of the fastening unit 68 and disposed horizontally, and includes a front portion coupled integrally with the lower end of the front vertical rod 62 and a rear portion coupled integrally with the lower end of the rear vertical rod 62.

The seating block 60 described above is movably mounted as connected to the pair of lifting blocks 50 disposed at opposite lower sides thereof. The pair of lifting blocks 50 are respectively coupled to the opposite lower portions of the seating block 60, and performs an operation for enabling the seating block 60 to have at least one of a lifting movement and a rotational movement The pair of lifting blocks 50 according to the disclosure basically includes a casing 10 forming an inner space, an actuator 20 mounted to the inside of the casing 10, and a link assembly 30 coupled to the operation frame 40 to which the connecting rod 69 is connected, and operating the operation frame 40 as activated by the actuator 20 to generate the lifting movement and the rotational movement of the seating block 60.

Each lifting block 50 with the foregoing configuration is protected from the outside by the casing 10 so as to improve an outer appearance and protect components. In other words, the actuator 20 and the link assembly 30 are provided inside the casing 10. The actuator 20 and the link assembly 30 are connected to a frame assembly 13 basically provided inside the casing 10.

According to the disclosure, the lifting blocks 50 for operating the seating block 60 are disposed at the opposite sides of the lifting block 50 and configured as a pair, thereby having advantages of smoothly operating regardless of a user's weight and preventing troubles due to overload.

As described above, the lifting blocks 50 according to the disclosure are disposed at the opposite sides and have the same configuration and operation. Therefore, the configuration and operation of only one lifting block 50, i.e., one lifting block 50, which is disposed at one side, between the pair of lifting blocks 50 will be representatively described below, and the description will be equally applied to the configuration and operation of the other lifting block 50.

BEST MODE

Below, the configuration and operation of the lifting block 50 according to the disclosure will be described in detail.

Figure 10:
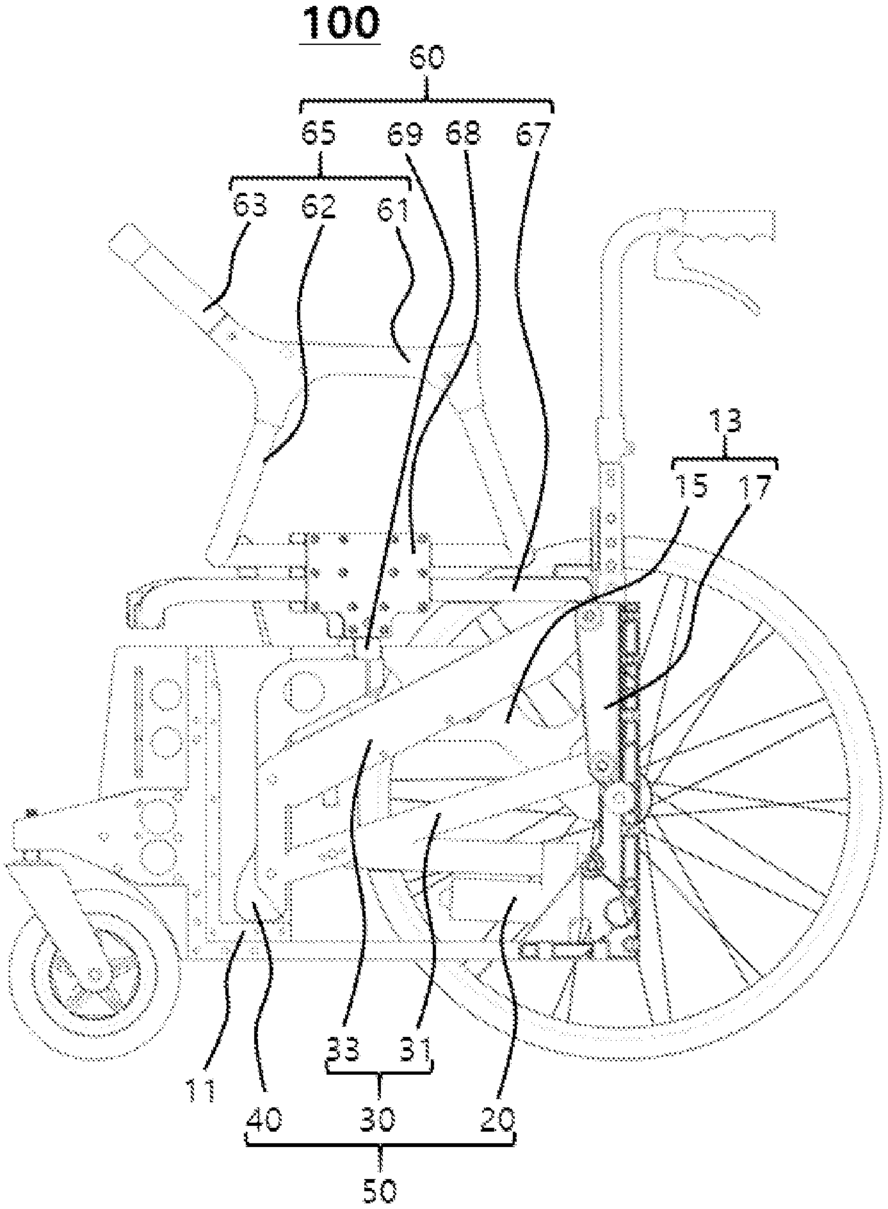
FIG. 10 is a lateral view showing the inside of a wheelchair with a lifting function according to an embodiment of the disclosure before being lifted.
Figure 11:
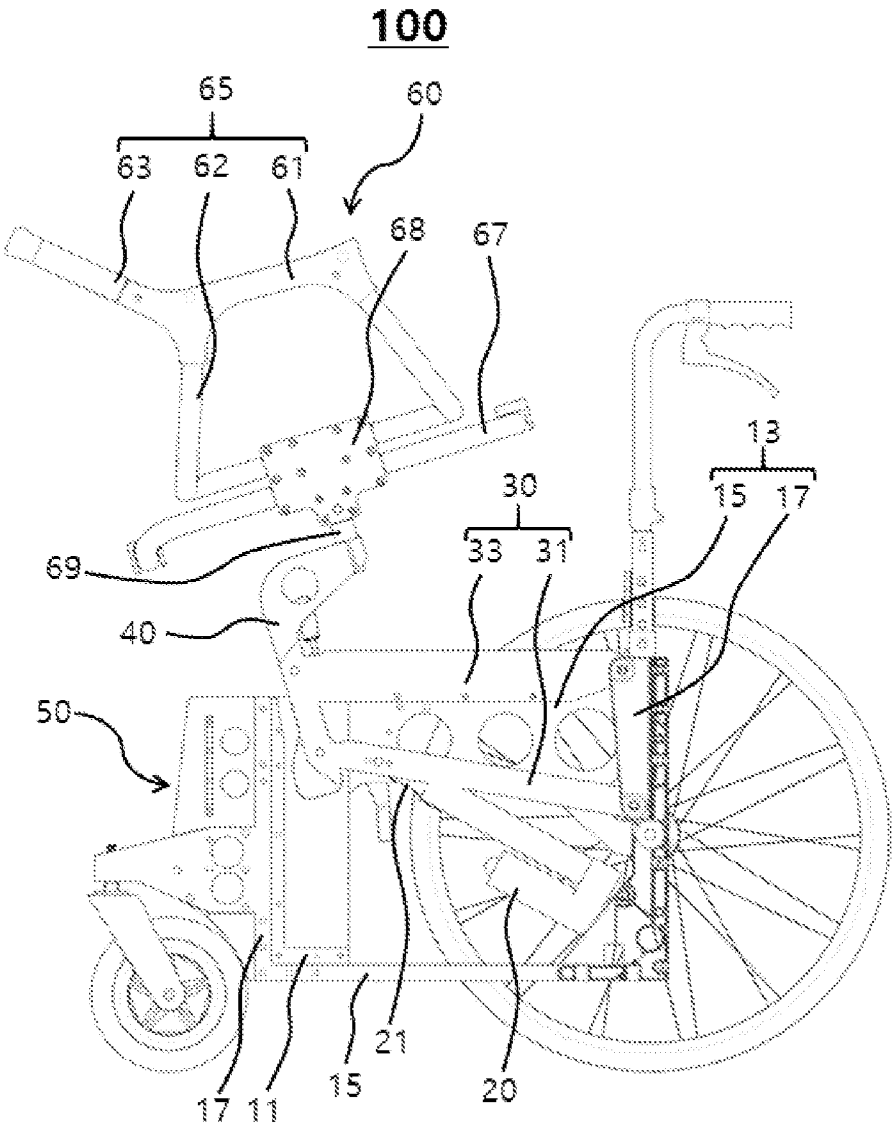
FIG. 11 is a lateral view showing the inside of a wheelchair with a lifting function according to an embodiment of the disclosure after being lifted.

FIG. 10 is a lateral view showing the inside of a wheelchair with a lifting function according to an embodiment of the disclosure before being lifted, and FIG. 11 is a lateral view showing the inside of a wheelchair with a lifting function according to an embodiment of the disclosure after being lifted.

The casing 10 enables the actuator 20 and the link assembly 30 to rotatably disposed therein with a firm and stable structure. In other words, the casing 10 is internally provided with the frame assembly 13 to which one ends of the actuator 20 and the link assembly 30 are rotatably connected.

The frame assembly 13 includes a plurality of horizontal frames 15 and a plurality of vertical frames 17 connected to the plurality of horizontal frames 15. The plurality of horizontal and vertical frames 15 and 17 are coupled to each other to firmly configure the frame assembly 13, and are disposed to connect the actuator 20 and the link assembly 30.

The actuator 20 is stably mounted to the inside of the casing 10 and operates the link assembly 30 so that the operation frame 40 connected to the connecting rod 69 of the seating block 60 can be lifted and rotated by the link assembly 30.

The link assembly 30 is activated by the actuator 20 and operates the operation frame 40 coupled to the connecting rod 69 of the seating block 60. The link assembly 30 is connected to the operation frame 40, and the operation frame 40 is detachably coupled to the connecting rod 69 formed in a lower portion of the seating block 60, so that the seating block 60 can have the lifting movement and the rotational movement according to the operation of the operation frame 40.

In summary, the link assembly 30 is connected to the operation frame 40 detachably coupled to the connecting rod 69 formed in the lower portion of the seating block 60, and operates the operation frame 50 according to the operation of the actuator 20, thereby generating the lifting movement and the rotational movement of the seating block 60.

The operation frame 40 is detachably connected to the connecting rod 69, and the connecting rod 69 is firmly coupled to the lower portion of the seating block 60, so that the seating block 60 can have the lifting movement and the rotational movement according to the operation of the link assembly 30. The link assembly 30 for generating the movement of the operation frame 40 may be variously configured as long as it can apply the lifting movement and the rotational movement for the seating block 60 to the operation frame 40 according to the operation of the actuator 20.

The seating block 60 according to the disclosure is detachably coupled to the operation frame 40. Specifically, the seating block 60 is detachably connected to the operation frame 40 by the connecting rod 69 formed in the lower portion thereof. As a result, the wheelchair with the lifting function can be easily folded with the seating block 60 easily mountable to and demountable from the operation frame 40, thereby reducing time, effort and cost for its assembly, disassembly and further maintenance. The wheelchair 100 with the lifting function according to the disclosure is foldable after demounting the seating block 60 from the lifting block 50 as shown in FIGS. 5 to 8.

The link assembly 30 according to the disclosure includes a first link 31 that has a first end pivotally connected inside the casing 10 and a second end pivotally connected to the operation frame 40, and a second link 33 that is disposed above the first link 31 and has a first end pivotally connected inside the casing 10 and a second end pivotally connected to the operation frame 40.

The first link 31 has the first end pivotally coupled inside of the casing 10, in particular, to the vertical frame 17 of the frame assembly 13, and the second end pivotally coupled to the operation frame 40. Likewise, the second link 33 has the first end pivotally coupled inside the casing 10, in particular, to the vertical frame 17 of the frame assembly 13, and the second end pivotally coupled to the operation frame 40. However, the second link 33 is disposed above the first link 31.

In this way, each first end of the first link 31 and the second link 33 is pivotally coupled inside the casing 10, in particular, to the vertical frame 17 of the frame assembly 13, and each second end is connected to the operation frame 40, so that the operation frame 40 can operate when the actuator 20 applies a driving force to the first link 31 or the second link 33, thereby enabling the seating block 60 coupled to the operation frame 40 by the connecting rod 69 to have the lifting movement and the rotational movement.

The actuator 20 includes a driving shaft 21 pivotally connected to the first link 31 or the second link 33, and preferably connected to a portion adjacent to a pivotal connection position with the operation frame 40, i.e., a portion adjacent to the second end of the first link 31 or the second link 33 in order to minimize the driving load of the actuator 20 and improve the driving stability of the actuator 20.

The first link 31 and the second link 33 have not only the lifting movement but also the rotational movement, and therefore the actuator 20 is also rotatably connected to the first link 31 or the second link 33. Specifically, the actuator 20 is rotatably connected inside the casing 10, in particular, to the vertical frame 17 of the frame assembly 13, and the driving shaft 21 of the actuator 20 is driven forward and backward by the actuator 20, being rotatably connected to the first link 31 or the second link 33.

Because the driving shaft 21 of the actuator 20 is rotatably coupled to the first link 31 or the second link 33, the operation frame 40 connected to each second end of the first link 31 and the second link 33 can operate having the lifting movement and the rotational movement as the driving shaft 21 is driven forwards and backwards.

Meanwhile, the first link 31 and the second link 33 have the rotational movement as the operation of the actuator 20, and therefore the actuator 20 connected to the first link 31 or the second link 33 is also coupled to inside the casing 10, in particular, directly rotatably coupled to the vertical frame 17 of the frame assembly 13.

The actuator 20 may employ various actuators such as a hydraulic cylinder and a pneumatic cylinder. Further, the actuator 20 may preferably be rotatably coupled to the first link 31 disposed at a lower side by taking structural stability and operation without interference into account.

Meanwhile, it is necessary to stably support the operation frame 40 before the seating block 60 is lifted up, in other words, in the state that the seating block 60 is in a lowered position (see FIG. 10), and prevent the seating block 60 from being excessively lowered according to the weight of a user. To this end, a supporting stopper 11 may be provided at a lower side inside the casing 10 so as to support the lower end of the operation frame 40 and perform a stopping operation. Thus, the operation frame 40 and the link assembly 30 are prevented from being overloaded, thereby preventing damage and prolonging their life.

The wheelchair 100 with the lifting function according to the disclosure includes the pair of wheel sets 70 for travel. The pair of wheel sets 70 are respectively coupled to the lifting blocks 50, thereby allowing the wheelchair 100 to travel. Specifically, each of wheel sets 70 includes a front wheel 71 coupled to a front side of each lifting block 50, and a rear wheel 73 coupled to a rear side of each lifting block 50.

The front wheel 71 has a swivel structure and employs a wheel having a smaller diameter than the rear wheel 73. The rear wheel 73 rolls only in forwards and backwards directions, is firmly coupled having a non-swivel structure, and employs a wheel having a larger diameter than the front wheel 71.

The rear wheel 73 needs to be prevented from rolling when the wheelchair is stopped. To this end, a wheel stopping unit 77 is formed on an outer surface of each lifting block 50 so as to suppress the movement of the rear wheel 73. The wheel stopping unit 77 includes a stop handle 76 shifted forwards and backwards under control of a user or a user assistant, and a stop lever 75 connected to the stop handle 76 and being in close-contact with or spaced apart from the rear wheel 73 according to the shift of the stop handle 76.

For example, when a user or the like pushes the stop handle 76 frontwards, the stop lever 75 interlocks and comes into close contact with the rear wheel 73, thereby preventing the rear wheel 73 from rolling. In this state, when a user or the like pulls the stop handle 76 backwards, the stop lever 75 interlocks and is spaced apart from the rear wheel 73, thereby allowing the rear wheel 73 to roll again.

The wheelchair 100 with the lifting function according to the disclosure may be controlled to move by a caregiver, who takes care of a user such as the sick and the elderly, or the like user assistant. To this end, the wheelchair with the lifting function according to the disclosure includes the pair of movement control units 90.

The pair of movement control units 90 are respectively coupled to the rear upper portion of the lifting blocks 50, thereby allowing the movement of the wheelchair to be controlled. In other words, a user assistant may move the wheelchair forwards or backwards or change a moving direction of the wheelchair while holding the pair of movement control units 90 respectively coupled to the rear upper portion of the lifting block 50 and extended upwards.

Each movement control unit 90 includes a pole 91 inserted in and coupled to the rear upper portion of the corresponding lifting block 50 and extended upwards, and a grip portion 93 horizontally extended backwards from the upper end of the pole 91 and forming a portion to be gripped by a user assistant.

Each movement control unit 90 may have a foldable structure to minimize the volume not to take up much room while the wheelchair is folded and transported. To this end, the pole 91 includes a foldable portion 92. The foldable portion 92 may employ various structures as long as it can be folded and unfolded.

Meanwhile, the rear wheel 73 may be immediately stopped by a user assistant holding and controlling the grip portion 93. To this end, the movement control unit 90 may further include a brake lever 95 formed below the grip portion 93. When a user assistant pulls the brake lever 95, a braking line provided inside the pole 91 is also pulled, thereby putting a brake on the rear wheel 97 with a braking block disposed adjacent to the shaft of the rear wheel 97.

The wheelchair 100 with the lifting function according to the disclosure may need to maintain a firm and stable posture in use. To this end, the wheelchair 100 with the lifting function according to the disclosure includes the connecting block 80 to connect the pair of lifting blocks 50 with each other.

The connecting block 80 for connecting the pair of lifting blocks 50 each other may have a structure for strong and stable connection without interfering with the folding of the wheelchair when the wheelchair is folded for carriage, shipping, storage, etc.

To this end, the connecting block 80 includes a front connection body 81 directly connecting the pair of lifting blocks 50, and a rear connection body 86 indirectly connecting the pair of lifting blocks 50 by connecting the pair of movement control units 90 each other, in which each of the front connection body 81 and the rear connection body 86 is formed in a separable or foldable way.

The front connection body 81 connects the insides of the pair of lifting blocks 50 each other with a separable or foldable structure. To this end, the front connection body 81 includes front pivotable portion 82 formed at the opposite sides thereof, and a front joint 83 in the middle thereof. The front hinge 82 is formed to have a structure for allowing the front connection body 81 to pivot forwards and backwards, and the front joint 83 is formed to have a foldable structure or a separable structure to be fastened with a fastener (not shown). With this structure, the front connection body 81 can be folded forwards or backwards.

The rear connection body 86 connects the poles 91 of the pair of movement control units 90 each other with a separable or foldable structure. To this end, the rear connection body 86 includes rear pivotable portion 87 formed at the opposite sides thereof, and a rear joint 88 in the middle thereof. The rear hinge 87 is formed to have a structure for allowing the rear connection body 86 to pivot forwards and backwards, and the rear joint 88 is formed to have a foldable structure or a separable structure to be fastened with a fastener (not shown). With this structure, the rear connection body 86 can be folded forwards or backwards.

The wheelchair 100 with the lifting function according to the disclosure may be used for the sick, the elderly or the like user who has less mobility. When such a user uses the wheelchair 100 with the lifting function according to the disclosure indoors or outdoors while sitting on the seating block 60, the user may suffer from urgent physiological activities (excrement or urine)

Figure 9:
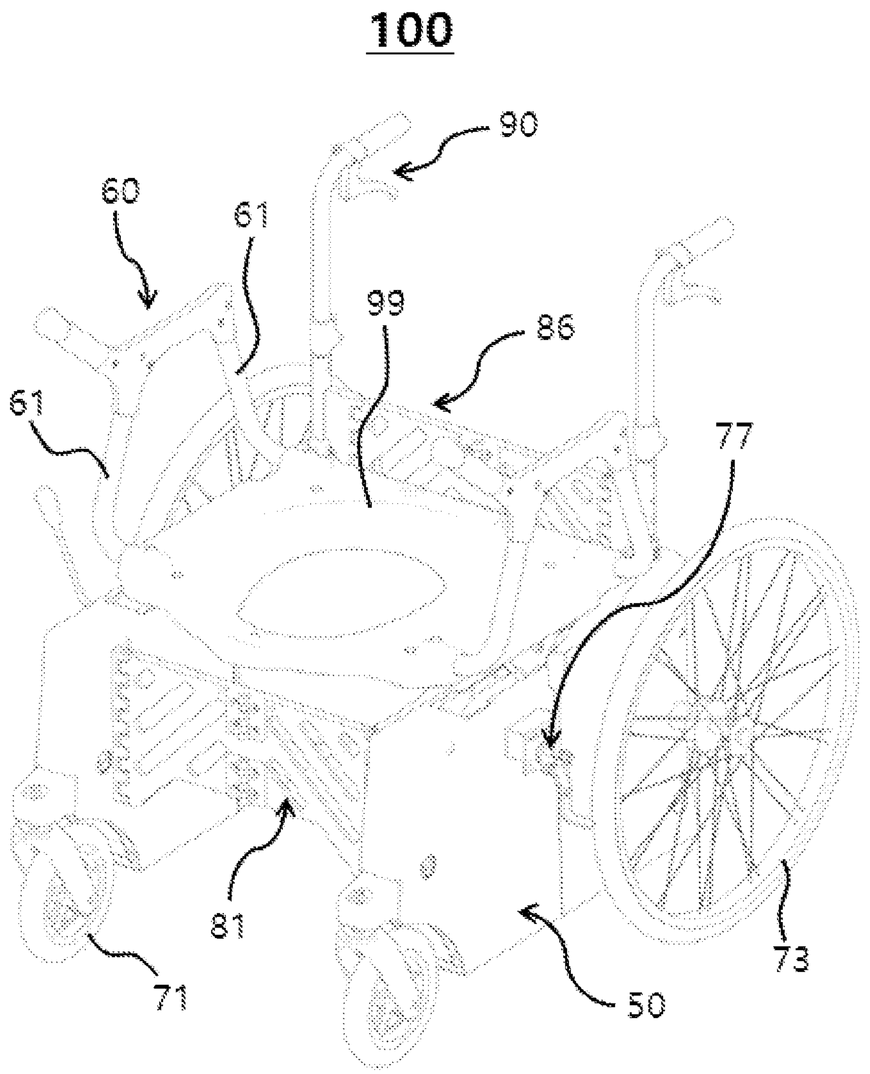
FIG. 9 is a perspective view of a wheelchair with a lifting function according to an embodiment of the disclosure, to which a toilet bowl is mounted.

To this end, the wheelchair 100 with the lifting function according to the disclosure may include a toilet bowl 99 provided in the seating block 60 as shown in FIG. 9. In this case, the toilet bowl 99 may be employed for and applied to the seating rod 67 of the seating block 60. The toilet bowl 99 may have a structure on which a user can sit.

Although a few embodiments of the disclosure have been described above, it will be apparent for a person having ordinary knowledge in the art that these descriptions are for the illustrative purposes only and various changes can be made without departing from the scope of the disclosure. Accordingly, the genuine technical scope of the disclosure should be defined by the appended claims.

INDUSTRIAL APPLICABILITY

A wheelchair with a lifting function according to the disclosure has a simple structure for automatically moving a seating block where a wheelchair user is sitting, and enables the seating block to have a lifting movement and a rotational movement, thereby having industrial applicability to simplify a structure and assist the wheelchair user in standing up safely.

The invention claimed is:

1. A wheelchair with a lifting function, comprising:

a seating block comprising a structure, on which a user can sit, and mounted movably;

a pair of lifting blocks connected to opposite lower portions of the seating block, and operating the seating block to have at least one of a lifting movement and a rotational movement;

a pair of wheel sets respectively coupled to the lifting blocks and enabling the wheelchair to move;

a pair of movement control units respectively coupled to rear upper portions of the lifting blocks and controlling the movement of the wheelchair; and a connecting block connecting the pair of lifting blocks each other, wherein the seating block comprises a pair of connecting rods respectively connected to the lifting blocks, a seating rod fastened to and supported on the pair of connecting rods, and a pair of safety bars respectively fastened to opposite sides of the seating rod and extended upward, and each safety bar comprises a horizontal rod disposed at a lateral upper side of the seating rod, a pair of vertical rods connecting a lower end of the horizontal rod and a lateral portion of the seating rod, and a handle connected to a front end of the horizontal rod or an upper end of the front vertical rod and extended being inclined frontwards and upwards, wherein the lifting block comprises a casing, an actuator mounted to an inside of the casing, and a link assembly coupled to an operation frame, to which the connecting rod 69 is connected, and operating the operation frame as activated by the actuator to generate the lifting movement and the rotational movement of the seating block, the link assembly comprises a first link that comprises a first end pivotally connected inside the casing and a second end pivotally connected to the operation frame, and a second link that is disposed above the first link and comprises a first end pivotally connected inside the casing and a second end pivotally connected to the operation frame, and the actuator is rotatably connected inside the casing, and a driving shaft of the actuator is driven forward and backward by the actuator, being rotatably connected to the first link or the second link.

2. The wheelchair of claim 1, wherein the connecting block comprises a front connection body directly connecting the pair of lifting blocks, and a rear connection body indirectly connecting the pair of lifting blocks by connecting the pair of movement control units each other, and each of the front connection body and the rear connection body is formed in a separable or foldable way.

* * * * *